(12) United States Patent
Singhi

(10) Patent No.: US 7,619,383 B2
(45) Date of Patent: Nov. 17, 2009

(54) HIGH STEPS BRUSHLESS DC (BLDC) MOTOR

(75) Inventor: Kapil Singhi, Chandigarh (IN)

(73) Assignee: STMicroelectronics Pvt. Ltd, Uttar Pradesh (IN)

( * ) Notice: Subject to any disclaimer, the term of this patent is extended or adjusted under 35 U.S.C. 154(b) by 136 days.

(21) Appl. No.: 11/833,393

(22) Filed: Aug. 3, 2007

(65) Prior Publication Data

US 2008/0030157 A1 Feb. 7, 2008

(30) Foreign Application Priority Data

Aug. 4, 2006 (IN) .......................... 1783/DEL/2006

(51) Int. Cl.
*H02P 6/14* (2006.01)
(52) U.S. Cl. .................. 318/400.26; 318/815; 318/132

(58) Field of Classification Search ............ 318/400.26, 318/815, 132; 388/815, 811, 819, 820, 928.1
See application file for complete search history.

(56) References Cited

U.S. PATENT DOCUMENTS 6,128,436 A * 10/2000 Bos et al. ..................... 388/815

* cited by examiner

*Primary Examiner*—Karen Masih
(74) *Attorney, Agent, or Firm*—Lisa K. Jorgenson; Allen, Dyer, Doppelt, Milbrath & Gilchrist, P.A.

(57) ABSTRACT

A brushless motor circuit is for driving a brushless direct current (BLDC) motor. The motor includes a rotor and exciting coils for respective phases in a three-phase winding in a star configuration. A neutral point in the star configuration is configured to switch to one of a ground voltage, a supply voltage, and an open circuit voltage to provide more combinations. The combinations provide extra steps in one revolution for a better resolution with enhanced efficiency.

12 Claims, 12 Drawing Sheets

HIGH STEPS BRUSHLESS DC (BLDC) MOTOR

FIELD OF THE INVENTION

The present invention relates generally to a brushless motor drive circuit formed as a semiconductor integrated circuit, and more specifically to a brushless motor drive circuit providing higher mechanical rotational steps for a better resolution.

BACKGROUND OF THE INVENTION

Direct current (DC) motors are very popular in variable speed drives due to simple speed control and simple control circuits. However, the DC motor initially used hard brushes, due to which the DC motors suffered from a low reliability and required frequent maintenance or replacement. These drawbacks of the DC motors were eliminated by using brushless DC motors (BLDC), which are highly reliable and can be used in applications requiring high speed.

A BLDC motor includes two coaxial magnetic armatures separated by an air gap. An external armature is called a stator and an internal armature is called a rotor. In the BLDC motor, the rotor is a permanent magnet and is supplied by a constant DC current. The stator is poly-phased, three-phases in the present invention, and is coveted by poly-phased currents. Three phase brushless DC motors are used in automotive equipment, refrigerators, air conditioners, compressors and fans due to their high efficiency, silent operation, compact form, reliability and longevity.

FIG. 1 illustrates a circuit diagram of star connected windings for a conventional BLDC motor. The star connected windings of the BLDC motor are connected to commutation switches. The commutation switches can be field effect transistors (FET). The star connected windings, such as coil A, coil B and coil C are connected in a star configuration with a neutral node 4. A node 1 of coil A is connected to switches S1 and S2. A node 2 of coil B is connected to switches S5 and S6 and a node 3 of coil C is connected to switches S3 and S4. The node 4 is unutilized and is kept at an open circuit voltage. The switches S1, S3 and S5 are connected to a supply voltage V and the switches S2, S4 and S6 are connected to a ground voltage. These switches can be controlled by specifically designed devices for motor control applications, like ST7FMC devices, as illustrated in FIG. 2.

Using a single-pole three-phase BLDC motor as illustrated above, one mechanical rotation can be achieved in six steps. Each step corresponds to 60 degrees of rotation, i.e., 360/6. The six steps are generated by switching different combinations of switches as illustrated in FIG. 3A and FIG. 3B. Step 1 shows a node 1 connected to the positive supply voltage V and the node 3 connected to the ground voltage, by turning the switches S1 and S4 to an on state. A resultant magnetic field will align the rotor in a direction as illustrated in step 1. In Step 2, the switches S1 and S6 are in the on state, so the node 1 is connected to the positive supply voltage V and the node 2 is connected to the ground voltage. The resultant magnetic field will turn the rotor in a counter clockwise direction by an additional 60 degrees as illustrated in step 2. In Step 3, the switches S3 and S6 are in the on state, so the node 2 is connected to the ground voltage and the node 3 is connected to the positive supply voltage V. As a result the rotor will be rotated by 60 degrees in the counter clockwise direction. The next corresponding three steps (Step1, Step2, Step3) are illustrated in FIG. 3B. By reversing switching patterns of these commutation switches a rotation in a clockwise direction can be achieved.

Therefore, there is a need of a brushless motor drive circuit to provide additional steps in one rotation for a better resolution in each step.

SUMMARY OF THE INVENTION

It is an object of the present invention to provide a cost effective brushless DC (BLDC) motor circuit for achieving additional steps in one mechanical revolution such as without utilizing any additional hardware. The proposed circuit is a cost effective technique as it can provide additional steps without utilizing two pole configurations, which need two different sets of coils for implementation.

It is another object of the present invention to provide a brushless DC (BLDC) motor circuit providing additional rotation steps for a better resolution and efficiency.

To achieve the objectives, the present invention provides a brushless motor circuit driving a brushless direct current (BLDC) motor. The motor may have a rotor and exciting coils, with the coils wound in a three-phase winding connected in a star configuration to provide additional rotational steps for a high resolution. The motor may comprise a detector circuit detecting an induced voltage generated across the exciting coil; a rotor position signal generating circuit producing a specified position signal for exciting the coil of each phase; and a control circuit performing excitation control of the exciting coils by controlling switching elements for conducting excitation currents via the exciting coils and based on the rotor position signal. A neutral node in the star configuration may be switched to one of a ground voltage, a supply voltage, and an open circuit voltage to provide the additional steps.

Further, the present invention provides a method of providing additional rotational steps in a brushless DC motor for a better resolution. The motor may have a rotor and exciting coils wound in a three-phase winding connected in a star configuration. The method may comprise detecting an induced voltage generated across the exciting coil through a detector circuit; producing a specified position signal for the exciting coil of each phase through a rotor position signal generating circuit; and performing excitation control of the exciting coils by controlling switching elements for conducting excitation currents via the exciting coils through a control circuit. A neutral point of the star configuration may be switched to one of a ground voltage, a supply voltage, and an open circuit voltage to provide the additional rotational steps.

BRIEF DESCRIPTION OF THE DRAWINGS

The present invention is described with the help of accompanying drawings.

DETAILED DESCRIPTION OF THE PREFERRED EMBODIMENTS

Figure 1:
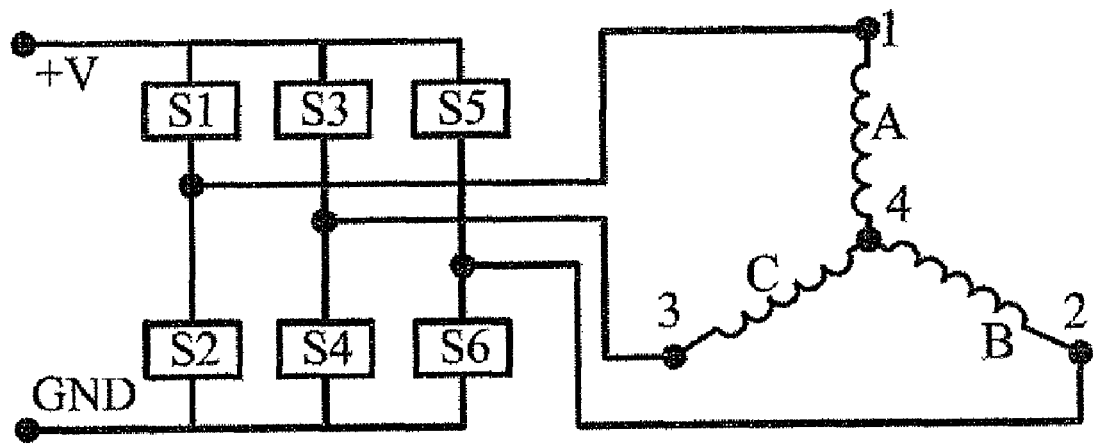
FIG. 1 illustrates a circuit diagram of star connected windings for a conventional BLDC motor.
Figure 2:
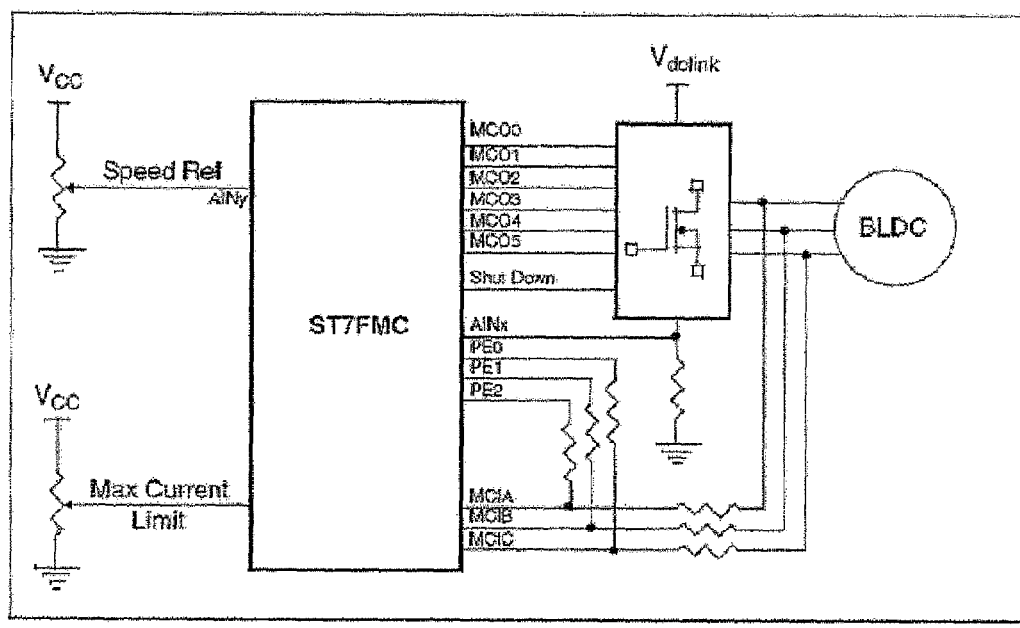
FIG. 2 illustrates a circuit diagram for microcontroller switches connected to the conventional BLDC motor.
Figure 3A:
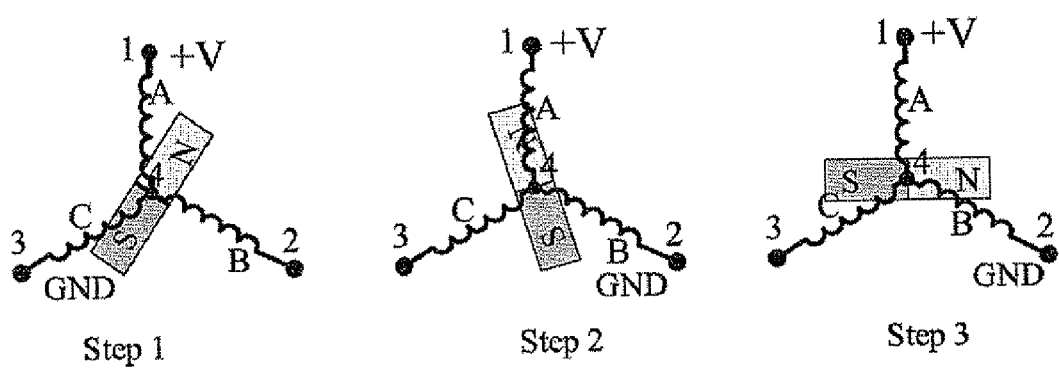
FIGS. 3A and 3B illustrates 6 orientation steps for a conventional BLDC motor as illustrated in FIG. 1.
Figure 3B:
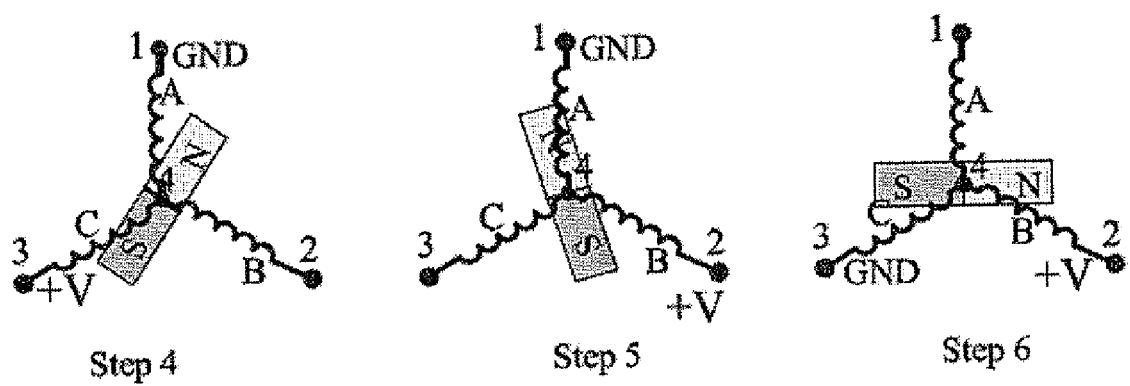
Figure 4:
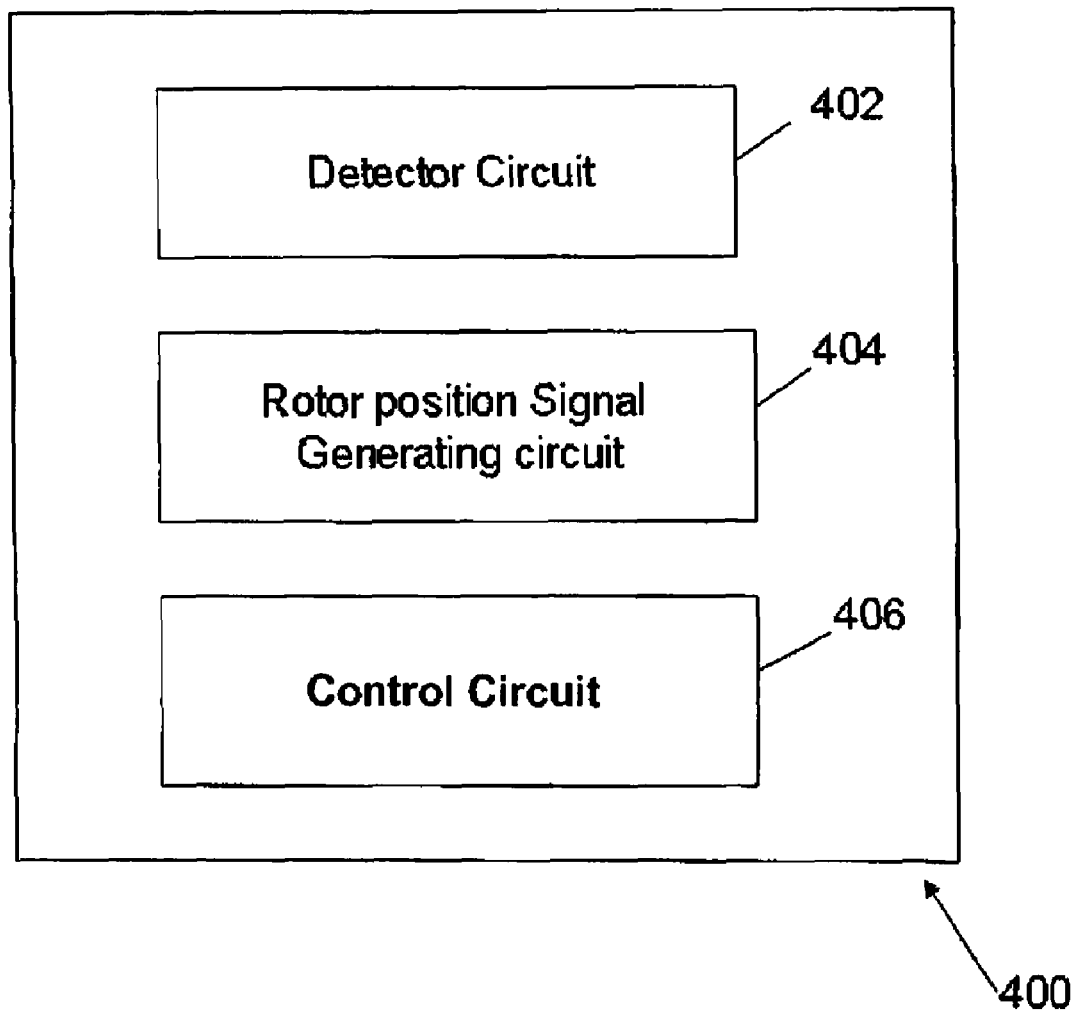
FIG. 4 illustrates a block diagram of a brushless DC (BLDC) circuit according to the present invention.

FIG. 4 illustrates a block diagram of a brushless DC (BLDC) circuit 400 according to the present invention. The BLDC circuit 400 drives a brushless DC (BLDC) motor having 12 steps in one mechanical rotation. The motor includes a rotor and multiple exciting coils connected in a star topology in a three-phase winding, such that a neutral node of the star topology is utilized and switched to one of a supply voltage, a ground voltage and an open circuit voltage. The neutral node is connected to more switches for providing more combinations for additional steps. The circuit 400 includes a detector circuit 402, a rotor position signal generating circuit 404, and a control circuit 406. The detector circuit 402 detects an induced voltage generated across the exciting coils. The circuit 404 generates a specified position signal for the exciting coils. The control circuit 406 performs an excitation control of the exciting coils by controlling switching elements for conducting excitation currents via the exciting coils.

Figure 5:
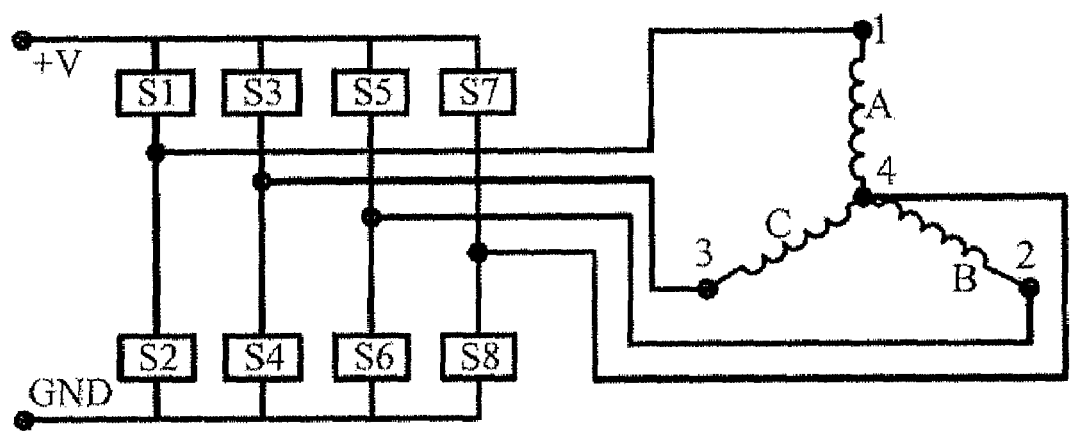
FIG. 5 illustrates a circuit diagram of star connected windings for a proposed brushless DC circuit (BLDC) according to present invention.

FIG. 5 illustrates a circuit diagram of star connected windings for a proposed brushless DC circuit (BLDC) according to the present invention. The star connected windings are connected to commutation switches. The commutation switches can be field effect transistors (FETs). The arrangement is such that, a neutral node 4 of the star configuration is used to provide one of a supply voltage, ground voltage, and an open circuit voltage. The neutral node 4 is connected to two extra switches S7 and S8 to provide more combinations for achieving additional steps per rotation (12 steps total). The additional step generation is explained in the following paragraphs.

The three winding coils A, B and C are connected in the star configuration having an activated neutral node 4. Node 1 of coil A is connected to switches S1 and S2, and node 2 of coil B is connected to switches S5, and S6 and node 3 of coil C is connected to switches S3 and S4. The neutral node 4 is connected to additional switches S7 and S8. The switches S1, S3, S5 and S7 are connected to a positive supply voltage V and the switches S2, S4, S6 and S8 are connected to the ground voltage side.

The above circuit arrangement provides 12 steps in one complete mechanical rotation. Each step corresponds to 30 degrees of rotation, i.e., 360/12 degrees. The 12 steps are generated by switching different combinations of switches as illustrated in FIGS. 6A, 6B, 6C, 6D, 6E and 6F.

Figure 6A:
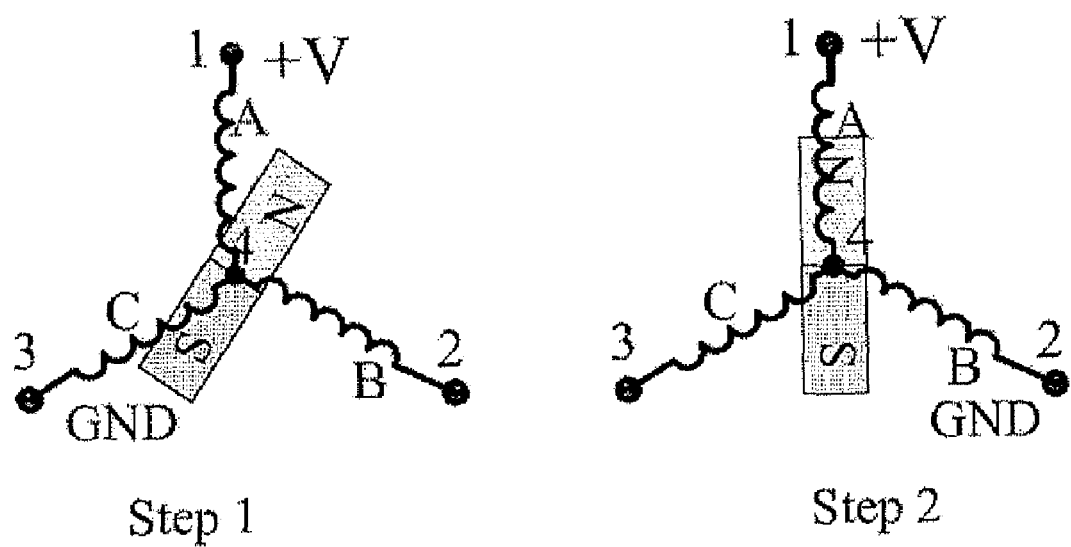
FIGS. 6A, 6B, 6C, 6D, 6E and 6F illustrates 12 orientation steps for a proposed BLDC circuit according to the invention.

FIG. 6A illustrates steps 1 and 2 for one mechanical rotation. In step 1, the switches S1 and S4 are made on so that the node 1 is connected to the positive supply voltage V and the node 3 is connected to the ground voltage. A resultant magnetic field will rotate the rotor in a counter clockwise direction by 30 degrees. In Step 2, the switches S1 and S8 are in an on state, such that the node 1 is connected to the positive supply voltage V and the node 2 is connected to the ground voltage. The resultant magnetic field will further turn the rotor in a counter clockwise direction by 30 degrees.

Figure 6B:
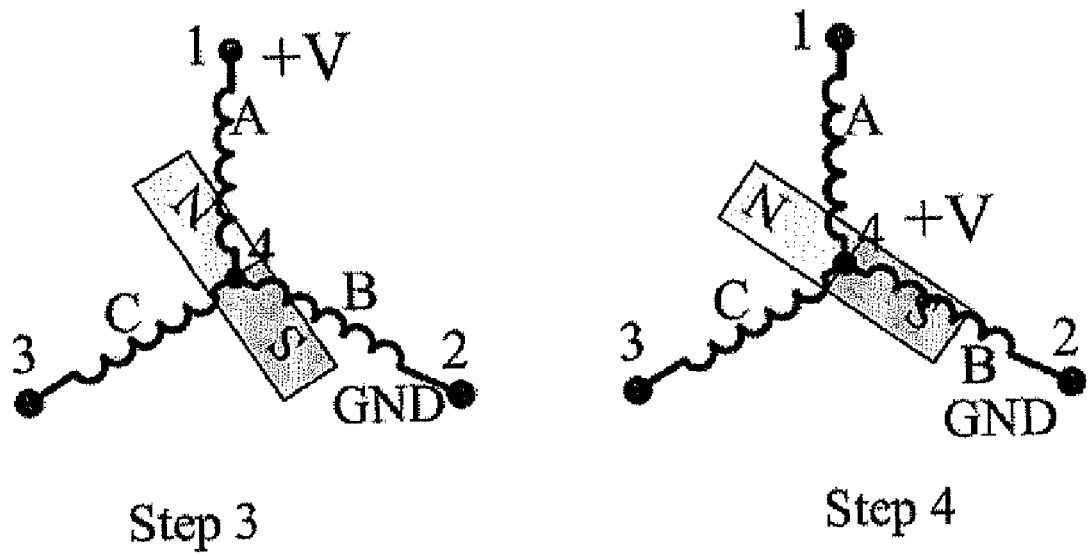

FIG. 6B further illustrates step 3 and step 4. In step 3, the switches S1 and S6 are turned on so that the node 1 is connected to the positive supply voltage V and the node 2 is connected to the ground voltage. A resultant magnetic field will rotate the rotor in a counter clockwise direction by 30 degrees. In step 4, the switches S6 and S7 are in the on state, such that the node 4 is connected to the positive supply voltage V and the node 2 is connected to the ground voltage. The resultant magnetic field will further turn the rotor in a counter clockwise direction by 30 degrees.

Figure 6C:
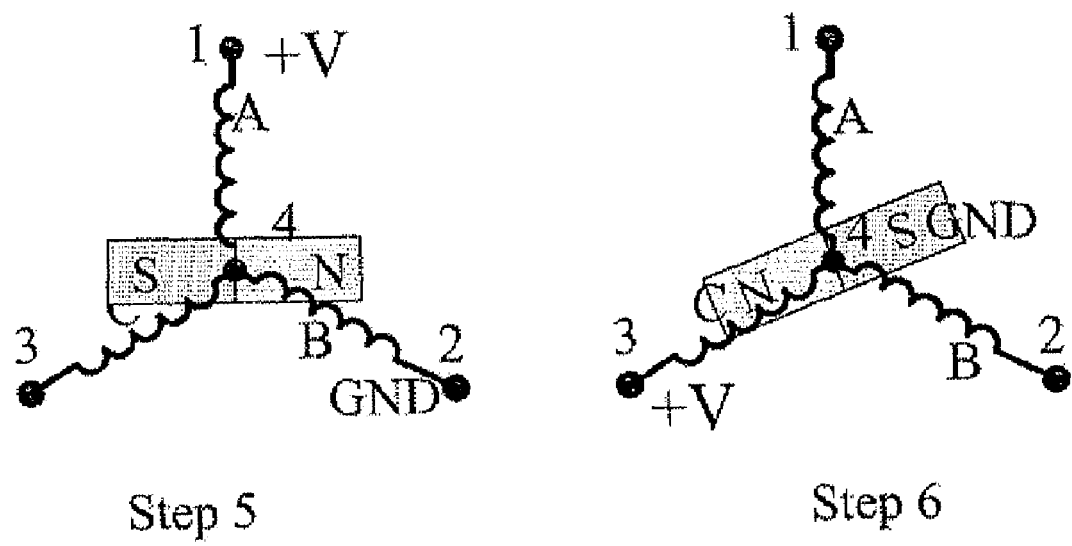

FIG. 6C further illustrates step 5 and step 6. In step 5, the switches S3 and S6 are turned on so that the node 3 is connected to the positive supply voltage V and the node 2 is connected to the ground voltage. A resultant magnetic field will rotate the rotor in a counter clockwise direction by 30 degrees. In step 6, the switches S3 and S8 are in the on state, such that the node 3 is connected to the positive supply voltage V and the node 4 is connected to the ground voltage. The resultant magnetic field will further turn the rotor in a counter clockwise direction by 30 degrees.

Figure 6D:
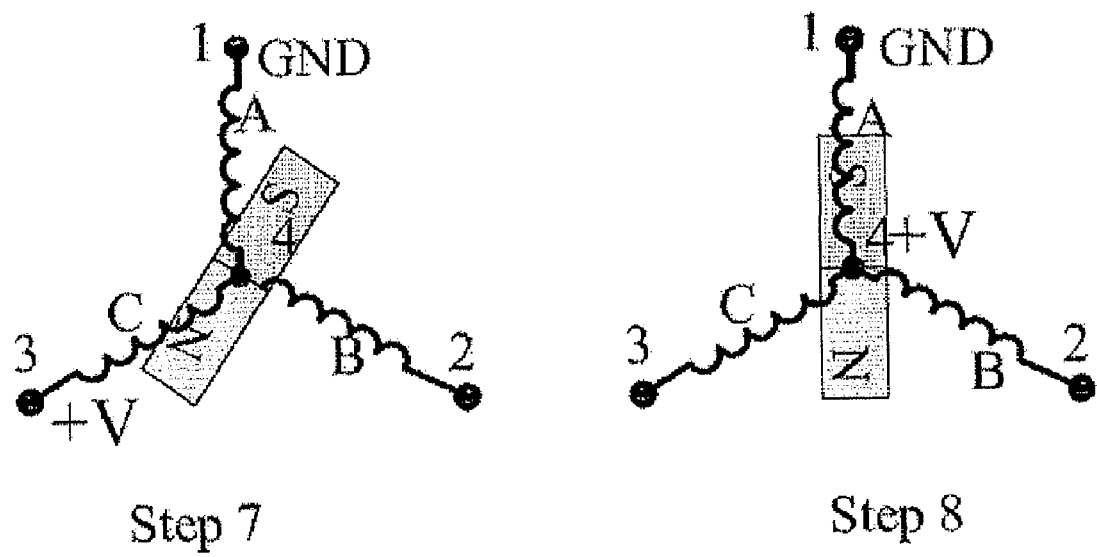

FIG. 6D further illustrates step 7 and step 8. In step 7, the switches S3 and S2 are turned on so that the node 3 is connected to the positive supply voltage V and the node 1 is connected to the ground voltage. A resultant magnetic field will rotate the rotor in a counter clockwise direction by 30 degrees. In step 8, the switches S2 and S7 are in an on state, such that the node 4 is connected to the positive supply voltage V and the node 1 is connected to the ground voltage. The resultant magnetic field will further turn the rotor in a counter clockwise direction by 30 degrees.

Figure 6E:
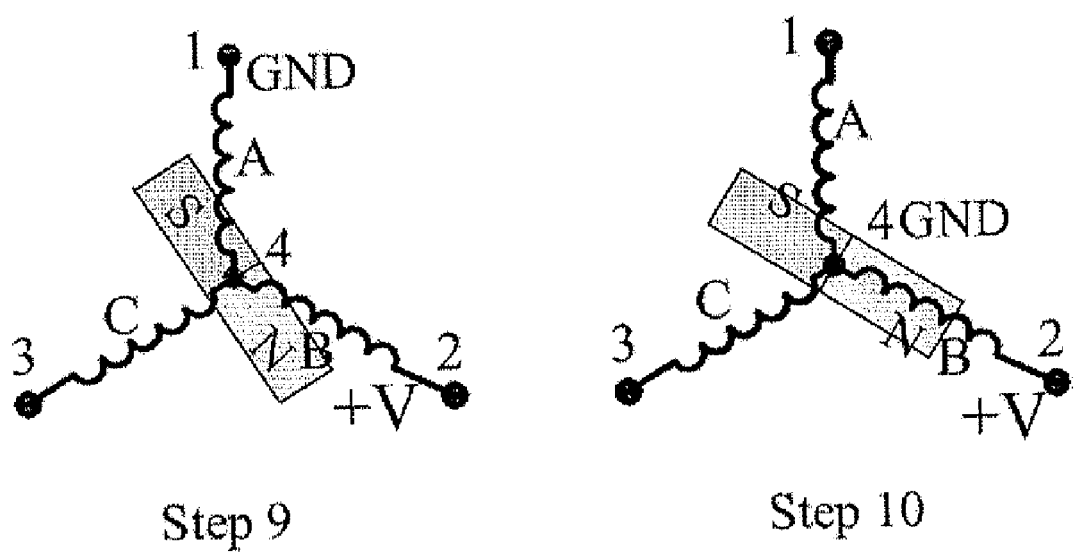

FIG. 6E further illustrates step 9 and step 10. In step 9, the switches S2 and S5 are turned on so that the node 2 is connected to the positive supply voltage V and the node 1 is connected to the ground voltage. A resultant magnetic field will rotate the rotor in a counter clockwise direction by 30 degrees. In step 10, the switches S8 and S5 are in the on state, such that the node 2 is connected to the positive supply voltage V and the node 4 is connected to the ground voltage. The resultant magnetic field will further turn the rotor in a counter clockwise direction by 30 degrees.

Figure 6F:
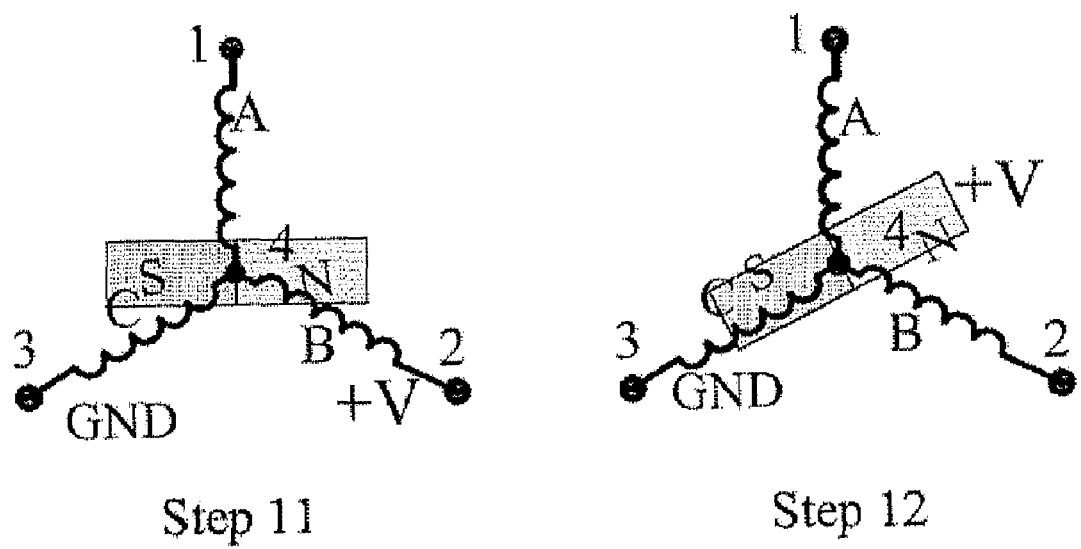

FIG. 6F further illustrates step 11 and step 12. In step 11, the switches S4 and S5 are turned on so that the node 2 is connected to the positive supply voltage V and the node 3 is connected to the ground voltage. A resultant magnetic field will rotate the rotor in a counter clockwise direction by 30 degrees. In step 12, the switches S4 and S7 are in the on state, such that the node 4 is connected to the positive supply voltage V and the node 3 is connected to the ground voltage. The resultant magnetic field will further turn the rotor in a counter clockwise direction by 30 degrees.

By reversing the switching pattern of the commutation switches a clockwise rotation of the motor can be achieved.

The proposed BLDC circuit that drives the BLDC motor offers many advantages. Firstly the BLDC motor provides a cost effective technique for achieving additional steps in a mechanical revolution for a better resolution for each step.

That which is claimed:

1. A brushless motor circuit to drive a brushless direct current motor including a rotor and exciting coils wound in a three phase star configuration having a neutral node, the circuit comprising:
   a detector circuit to detect induced voltages across the exciting coils;
   a rotor position signal generating circuit to produce specified rotor position signals for the exciting coils;
   a plurality of switching elements to be coupled between first and second supply voltages, and to be coupled to the exciting coils; and
   a control circuit to cooperate with said detector circuit and said rotor position signal generating circuit to perform excitation control of the exciting coils by controlling said plurality of switching elements to conduct excitation currents via the exciting coils;

said control circuit operable to provide one of the first and second supply voltages, and an open circuit voltage to the neutral node to provide additional rotational steps.

2. The circuit according to claim 1, wherein said plurality of switching elements comprises eight switching elements.

3. The circuit according to claim 1, wherein a total number of rotational steps comprises twelve steps.

4. The circuit according to claim 1 wherein the brushless direct current motor comprises a single pole three-phase brushless direct current motor; and wherein said control circuit is for operating with the single pole three-phase brushless direct current motor.

5. A brushless motor circuit to drive a brushless direct current motor including a rotor and exciting coils wound in a three phase star configuration having a neutral node, the circuit comprising:
    a detector circuit to detect induced voltages across the exciting coils;
    a rotor position signal generating circuit to produce specified rotor position signals for the exciting coils;
    a plurality of switching elements to be coupled between first and second supply voltages, and to be coupled to the exciting coils of each phase, said plurality of switching elements comprising first and second switching elements to be coupled to the neutral node; and
    a control circuit to cooperate with said detector circuit and said rotor position signal generating circuit to perform excitation control of the exciting coils by controlling said plurality of switching elements;
    said control circuit to selectively operate the first and second switching elements to provide one of the first and second supply voltages, and an open circuit voltage to the neutral node.

6. The circuit according to claim 5, wherein said control circuit provides twelve rotational steps.

7. The circuit according to claim 5, wherein said plurality of switching elements comprises eight switching elements.

8. The circuit according to claim 5 wherein the brushless direct current motor comprises a single pole three-phase brushless direct current motor; and wherein said control circuit is for operating with the single pole three-phase brushless direct current motor.

9. A method of providing additional rotational steps in a brushless DC motor for a better resolution, including a rotor and exciting coils in a three phase winding star configuration having a neutral node, the method comprising:
    detecting induced voltages across the exciting coils;
    producing specified rotor position signals for the exciting coils;
    coupling a plurality of switching elements between first and second supply voltages, and the exciting coils; and
    performing excitation control of the exciting coils by controlling the switching elements based upon the induced voltages and the rotor position signals;
    wherein controlling the switching elements comprises providing one of the first and second supply voltages, and an open circuit voltage to the neutral node to thereby provide the additional rotational steps.

10. The method according to claim 9, wherein the plurality of switching elements comprises eight switching elements.

11. The method according to claim 9, wherein a total number of rotational steps comprises twelve steps.

12. The method according to claim 9 wherein the brushless direct current motor comprises a single pole three-phase brushless direct current motor; and wherein control the switching elements comprises controlling the switching elements based upon the single pole three-phase brushless direct current motor.

* * * * *